Figure 4:
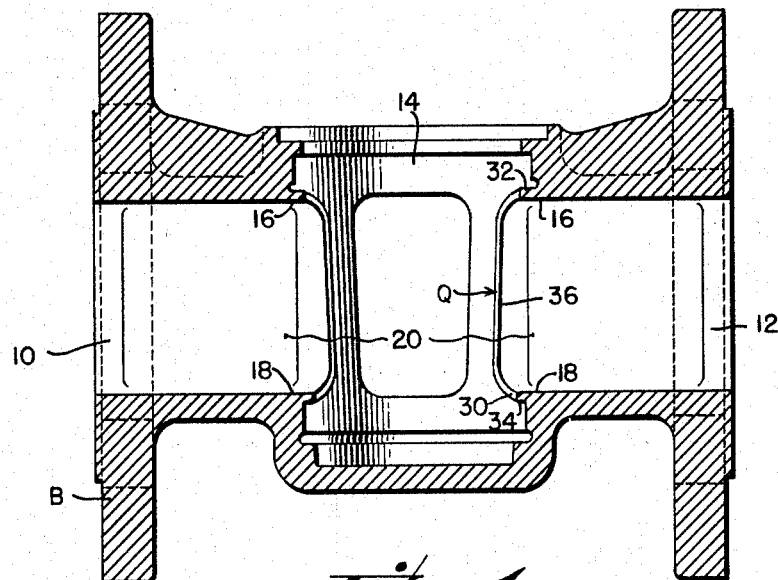

Aug. 2, 1966 　　C. L. REED, JR., ET AL　　3,263,697
LINED PLUG VALVE
Filed April 26, 1961　　　　　　　　　　　　5 Sheets-Sheet 1
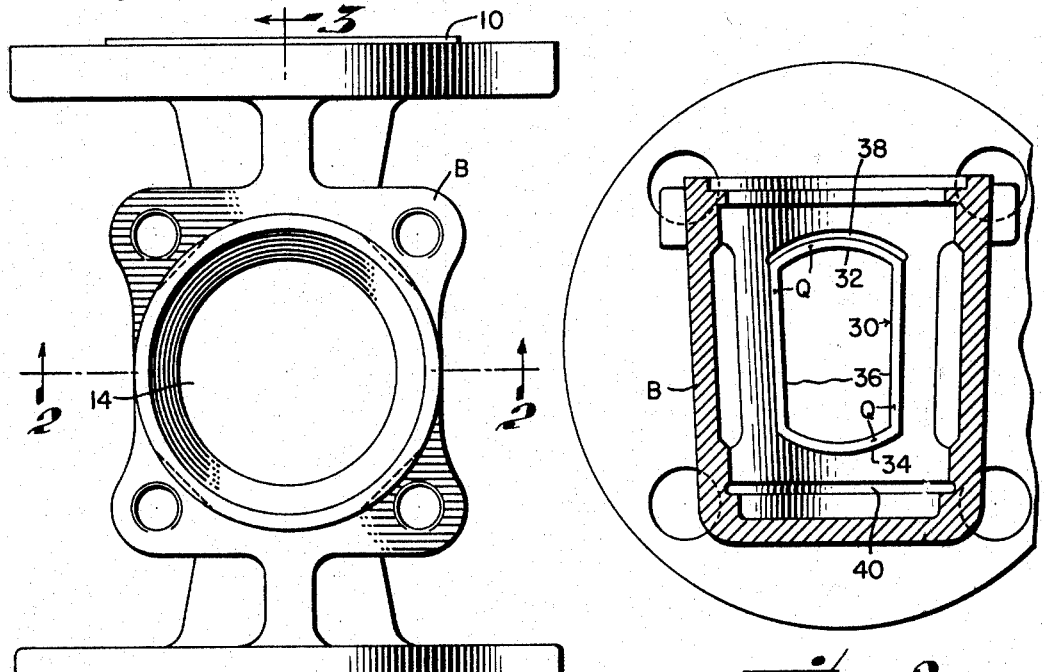
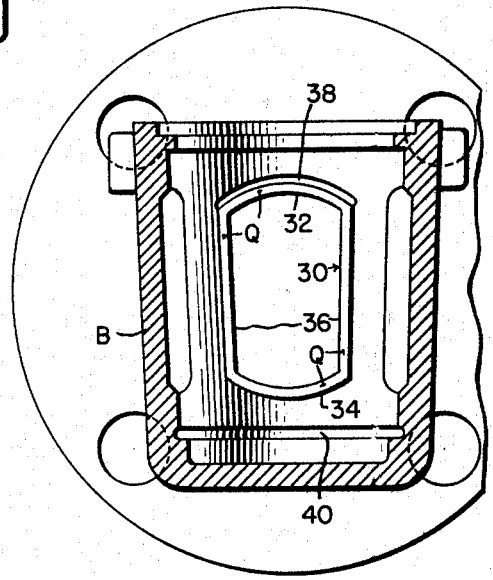
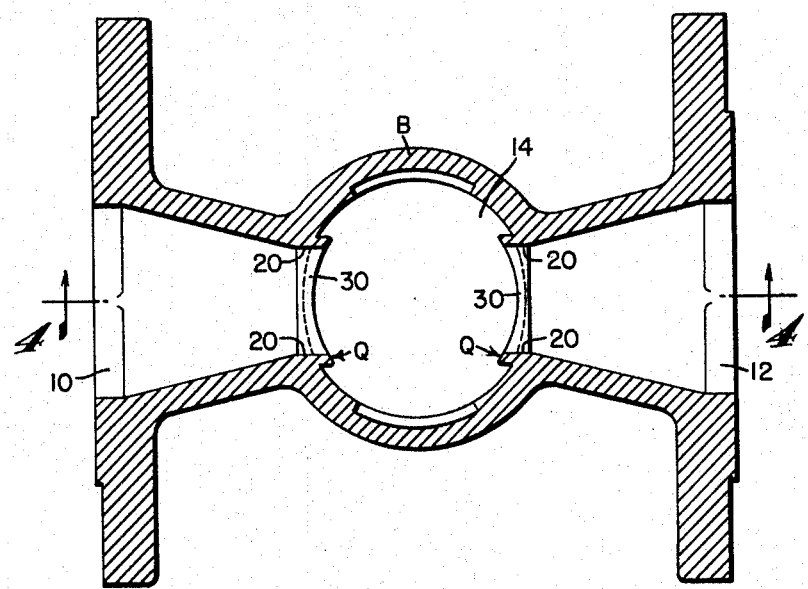
INVENTORS
CHARLES L. REED, JR.
RUSSELL G. SMITH
BY
J. Warren Kinney Jr.
ATTORNEY

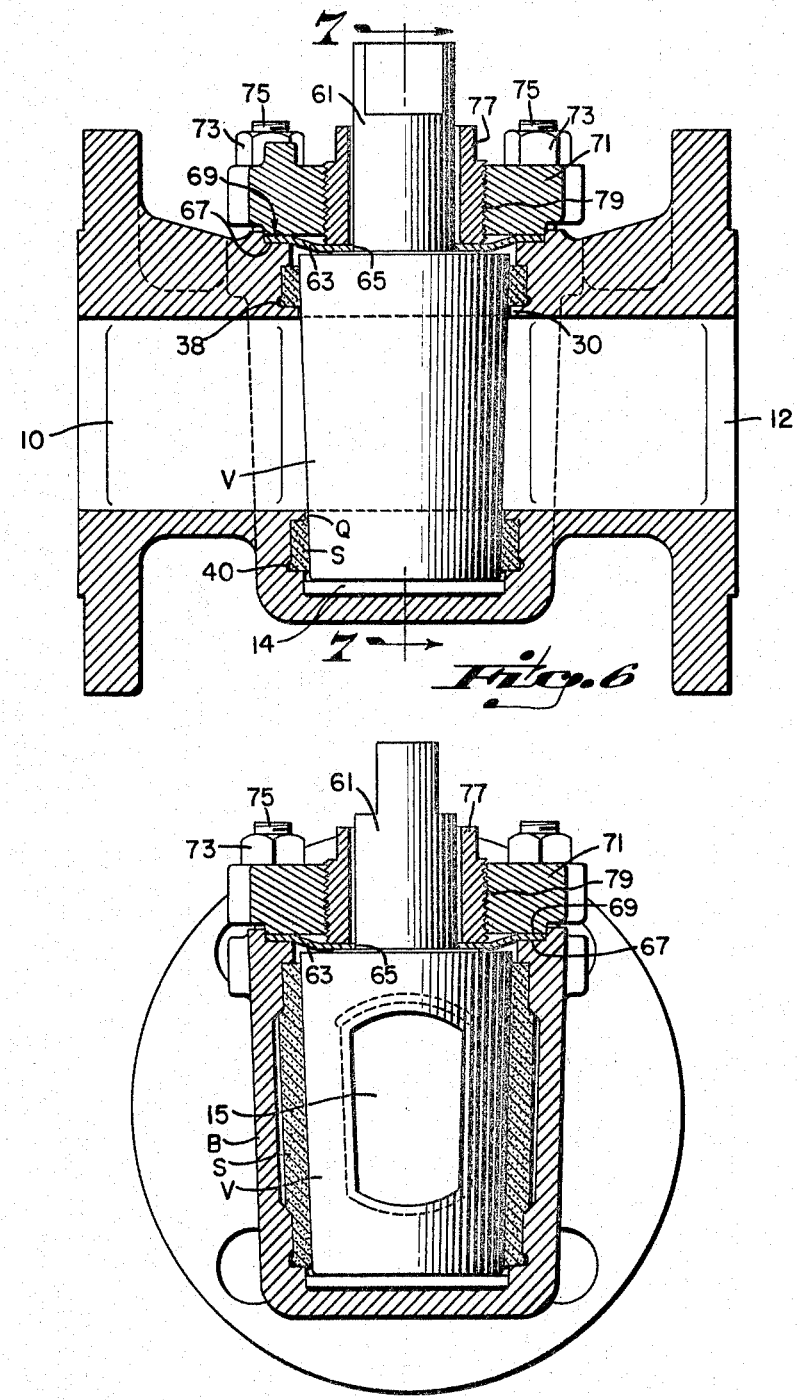

INVENTORS
CHARLES L. REED, JR.
RUSSELL G. SMITH
BY
J. Warren Kinney Jr.
ATTORNEY

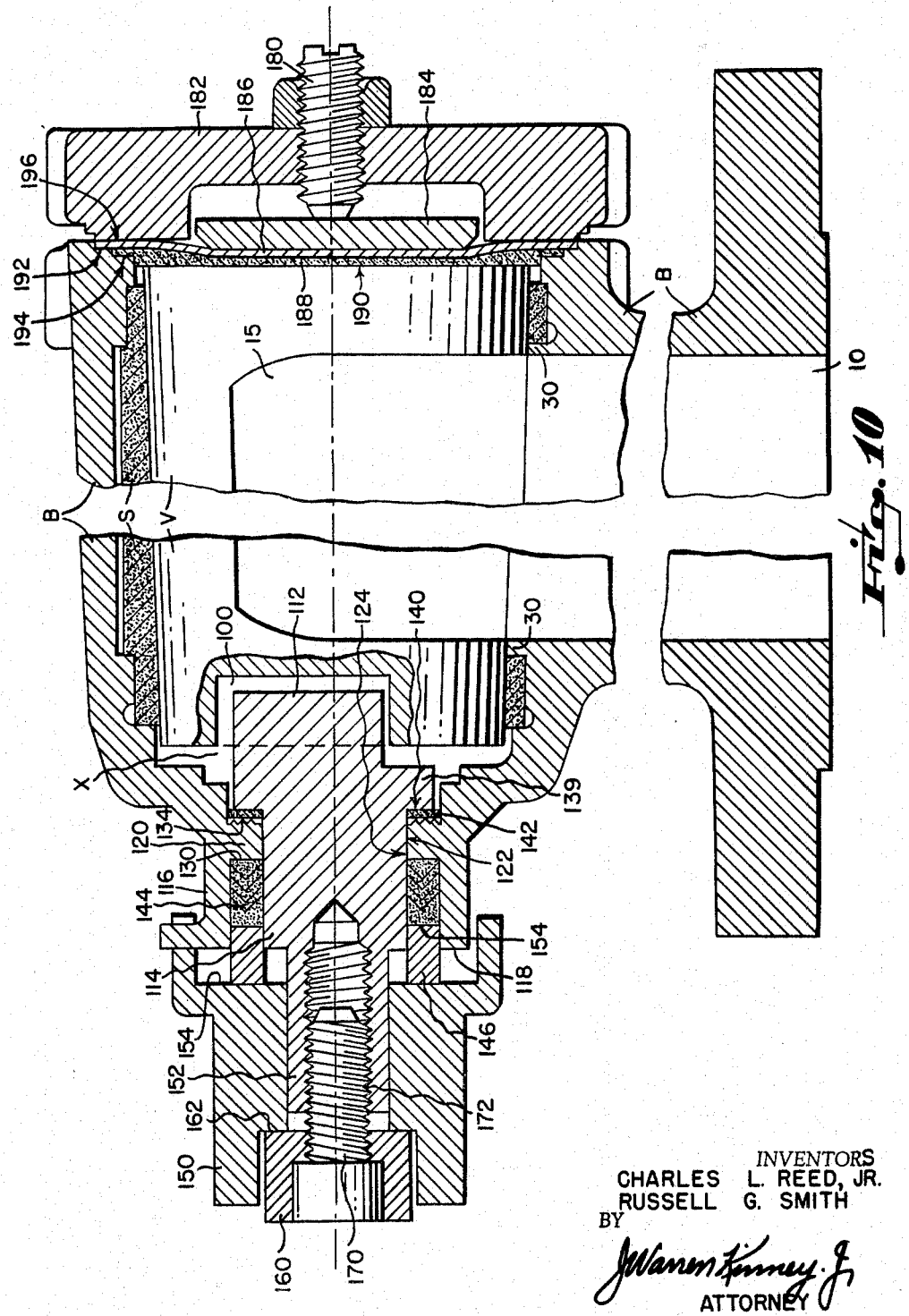

United States Patent Office 3,263,697
Patented August 2, 1966

3,263,697
LINED PLUG VALVE
Charles L. Reed, Jr., and Russell G. Smith, Cincinnati, Ohio, assignors to Continental Manufacturing Company, Cincinnati, Ohio, a corporation of Ohio
Filed Apr. 26, 1961, Ser. No. 105,592
3 Claims. (Cl. 137—375)

This invention relates to valves, and more particularly to a lined plug valve having a resilient sealing member interposed between the valving member and valve body.

An object of the invention is to provide a lined plug valve with simple yet highly effective means for anchoring a resilient sealing sleeve member relative to the valve body by means of radial port-defining lips which project through openings on the sealing member and extend toward the valving member. These lips effectively support the sealing member and provide a barrier which prevents a pressure differential from occurring between the inside and outside of the sealing sleeve member. Heretofore the accumulation of pressure media has caused sealing members to be distorted into the valve ports incident to operation of the valve.

A further object of the invention is to provide a lined rotary plug valve with a one-piece resilient sealing member which is secured between the body and valving members in such a manner as to permit the use of a sealing member which is just thick enough to provide the desired spacing between adjacent faces of the body and valving members and which sealing member may therefore be used primarily as a lubricant.

A further object of the invention is to provide a lined rotary plug valve wherein the body includes integral lips which project inwardly toward the valving member, and wherein the peripheral, valving-member-adjacent-faces of said lips comprise a valving surface or valve seat engageable, under certain conditions, by the valving member, per se, for providing an effective metal-to-metal seal between said lips and the valving member.

Still a further object of the invention is to provide a lined plug valve which is constructed in such a manner as to provide an effective valving element even though the sealing member or liner material initially disposed between the valving member and valve body should be volatilized or otherwise dissipated such as, by way of example, would occur when a valve is subjected to the heat of a fire or the like. This feature is of particular importance in those instances where valves are utilized to control such pressure media as hydrofluoric acid, rocket fuels, and other volatile, highly inflammable and/or inherently dangerous and explosive substances, which substances, but for certain novel features of the subject valve, would be free to escape from a conventional lined valve, in the event that the linear material was volatilized or otherwise dissipated while the valve was in use.

Another object of the invention is to provide a lined rotary plug valve which includes lips which circumscribe the body ports and project inwardly toward the valving member whereby any throttling of pressure media being controlled by the valve will occur between the metal surfaces of the valving member and lips rather than between the valving member and the liner.

Still another object of the invention is to provide a lined plug valve in which the operating stem is separate from and mounted for independent axial movement relative to the plug or valving member, and wherein the operating stem is constructed in such a manner as to effect a metal-to-metal seal for precluding the escape of material being handled by the valve in the event that the valve is subjected to temperatures of such magnitude as to volatilize or otherwise dissipate heat-volatilizable packing or sealing material disposed between certain portions of the stem and body.

Figure 5:
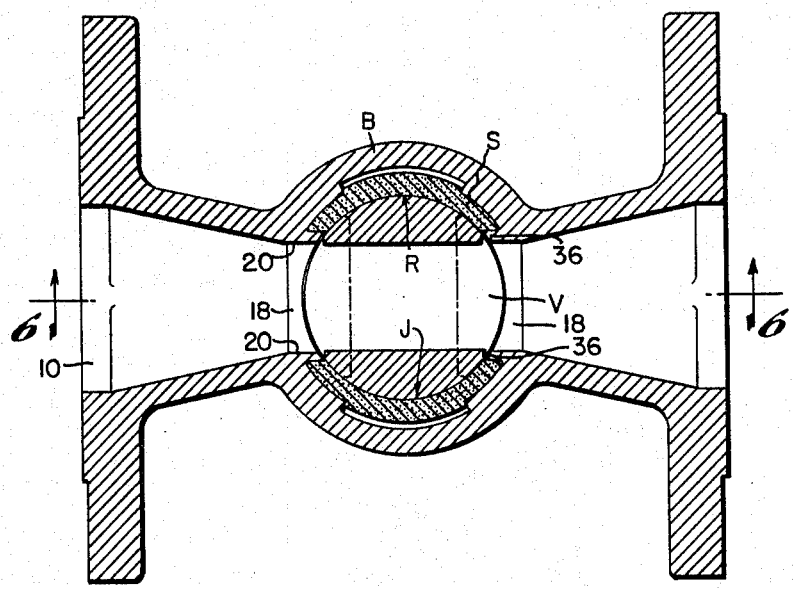
Figure 8:
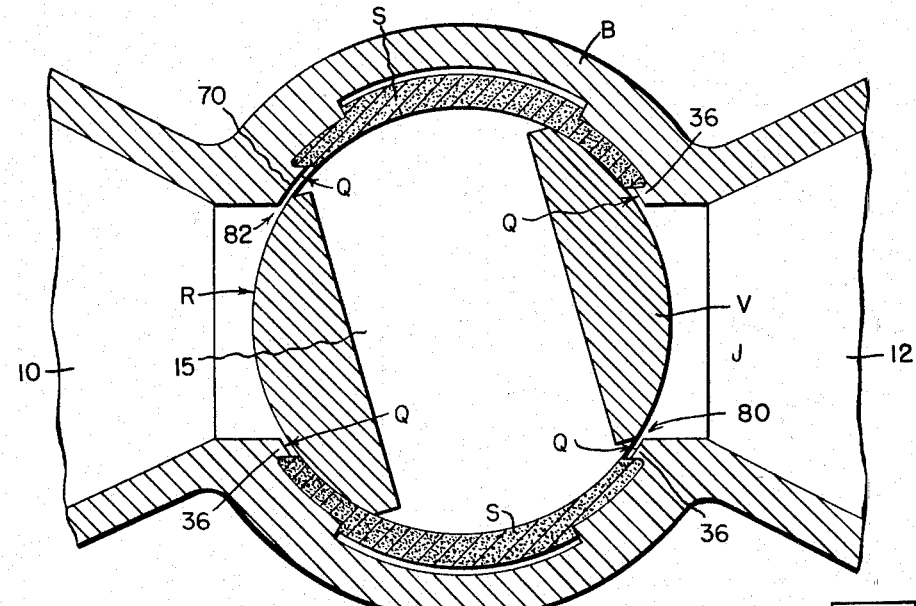
Figure 9:
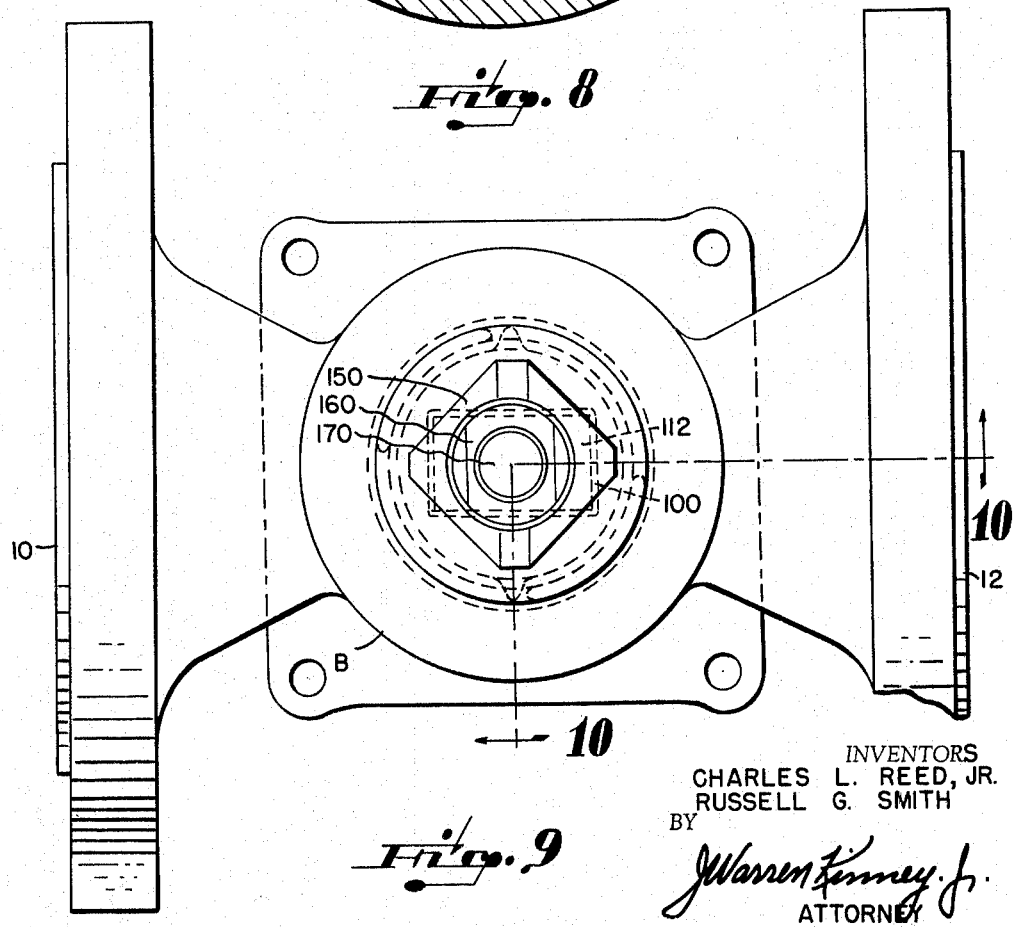

These and other objects are attained by the means described herein, and as disclosed in the accompanying drawings in which:

FIG. 1 is a top view of a typical plug valve body, per se, embodying the teachings of the present invention.
FIG. 2 is a sectional view taken on line 2—2 of FIG. 1.
FIG. 3 is a sectional view taken on line 3—3 of FIG. 1.
FIG. 4 is a sectional view taken on line 4—4 of FIG. 3.
FIG. 5 is a view similar to FIG. 3 with a valving member and sleeve operatively associated therewith.
FIG. 6 is a sectional view taken on line 6—6 of FIG. 5.
FIG. 7 is a sectional view taken on line 7—7 of FIG. 6.
FIG. 8 is an enlarged view of the center portion of FIG. 5 illustrating a modification thereof.
FIG. 9 is a top view of a valve construction embodying the teachings of the present invention, wherein the operating stem is separate from the valving member.
FIG. 10 is a section taken on line 10—10 of FIG. 9.

With particular reference now to the drawings, the letter B denotes a body member, V a valving member, and S a resilient sealing member or sleeve which is interposed between the body and valving members.

Body member B includes an inlet port 10, an outlet port 12 and an intermediate plug or valving member receptive chamber 14. The chamber-adjacent or inner ends of ports 10 and 12 are substantially rectangular and include top, bottom and side walls 16, 18 and 20, respectively, each of which terminates in a peripheral lip 30 having top, bottom and opposed side edges 32, 34 and 36, FIG. 2.

As clearly illustrated in FIGS. 3 and 4, the aforesaid lips project radially into chamber 14 toward the valving member, note FIGS. 5, 6, 8 and 10, said lips terminating in a valve seat or valving surface Q which is complementary to and adapted to be engaged by the valving member under certain conditions hereinafter set forth.

In the preferred embodiment of the invention, lips 30 are integral with the body member B.

With reference again to FIG. 2, the numerals 38 and 40 denote, generally, relief areas which are provided in the body member, said relief areas being disposed above upper lip 32 and below lower lip 34, respectively, as illustrated.

A liner, resilient sealing member or sleeve S is housed within the plug or valving member-receptive chamber 14, it being understood that said member is provided with passageways which are adapted to receive and fit over the outer, peripheral edge of the lips as illustrated in FIGS. 5 and 6. It will be noted that the lips extend through and therefore completely line and reinforce the peripheral face of the passageways of the sealing member.

In FIGS. 6 and 7 we have illustrated a valving member V which has an operating stem 61 formed integral therewith. The valving member is mounted for rotary movement relative to the body member for selectively placing the flow passage 15 of the valving member in and out of communication with the flow passages 10 and 12 of the body member.

A resilient sealing disc 63 having a central opening 65 for receiving stem 61 is securely though releasably clamped to the body member by reason of its peripheral edge being seated in annular recess 67 of the body member. The annular seat 69 of mounting plate 71 will tightly clamp the peripheral edge of the sealing disc incident to tightening of nuts 73 on bolts 75. It should be understood that the gasket combination illustrated in FIG. 10 provides a metal auxiliary seal on valves intended for fire resistant services.

A gland nut 77 threadably engages and extends through the internally threaded bore 79 of plate 71. Downward axial movement of the gland nut will effect a pressure and fluid tight seal between the upper end of the valving and body members.

The present invention is neither concerned with nor directed to the particular steps and/or techniques by which the resilient sealing member or sleeve is inserted and then secured in place by means of a sizing plug; nor with the manner of or means for rotatably mounting the valving member relative to the body member. In passing it should be understood that the relief areas 38 and 40 permit the sleeve material to cold flow into these relief areas while the sleeve is being sized.

With particular reference now to FIGS. 5, 6 and 8, it will be noted that sleeve S centers the valving member V within the body member B, and it also precludes contact between the valving member and the valving surfaces Q of the lips 30.

Uniformly satisfactory results have been obtained in those instances wherein the spacing between the adjacent surfaces of the valving member and lips has been in the neighborhood of .010 to .125 inch.

The widths of the top, bottom and side edges of the lips may be substantially uniform, as illustrated in FIG. 2, or the width of that side edge 70 (FIG. 8) of the lip of the inlet port 10 which is first covered incident to movement of the valving member for placing passageway 15 out of communication with the inlet port may be wider than the other side edges 36 of the lips.

However, whether the widths of the various lip edges are the same or different, they are all so related to the valving surface of the rotatable valving member V that all throttling of pressure media passing through the valve incident to movement of the valving member for placing passageway 15 out of and/or in communication with the lip-defined flow passages of the body member will occur between said lips and the valving member. In other words, any throttling effect or action will be confined to and occur between metallic surfaces. It will therefore be noted that the presence of the lips effectively precludes the sleeve S from being subjected to a throttling action; and it will likewise be noted that the lips effectively line the perimeter of the sleeve passages and thereby maintain the sleeve S in position while precluding pressure differentials occurring on opposite faces of the sleeve, which pressure differentials could or would dislodge the sleeve from the body member.

With particular reference now to FIGS. 5 and 8, it will be noted that the lips of the body member define the area of contact between sealing member S and valving member V, since the thickness of the sealing member is such as to normally preclude actual contact between valving seats or surfaces Q of the port-defining lips 30 of the body member and the valving surface of the valving member.

In FIG. 8 the width of side edge 70 of the lip of the inlet port 10 is wider than the width of the other side edge 36, and wider than side edges 36 of the lip of the outlet port 12. In this manner we have provided simple, yet highly effective means for insuring that the valve will always shut off first on the outlet, or downstream, side at 80 before the valve has been fully closed at 82 on the inlet, or upstream side, incident to movement of the valving member for placing passageway 15 out of communication with the lip-defined passageways of the inlet and outlet ports.

By first closing the valve on the downstream side, as at 80, before it is closed on the upstream side, as at 82, the sealing member S on the downstream side will remain under compression, and therefore relieved of forces which might tend to dislodge the sealing member from its seat.

The presence of wide side edge 70 also prevents those portions of the sealing member S adjacent the upstream side of the valve from being subjected to a high pressure differential incident to closing of the valve.

Uniformly satisfactory results have been obtained in those instances wherein the effective width of side edge 70 has exceeded the width of edges 36 by fifty percent or more.

If the subject valve should be subjected to the action of heat sufficient to volatilize the sealing material B, the pressure of the fluid media against the upstream side R of the valving member will result in the valving member being laterally shifted, to the left in FIGS. 5 and 8, whereby valving face J thereof will engage the valving surface Q of the lips of the downstream or outlet port 12 and thereby preclude the escape or passage of pressure media through the valve, even though the sealing material may have been completely dissipated.

This feature is of great importance in those instances wherein valves handling corrosive, explosive and/or highly inflammable fluids are likely to be subjected to such high temperatures, such as, by way of example, during a fire, as to volatilize the sleeve material.

With reference now to the modified valve of FIGS. 9 and 10, it will be noted that the upper end of the valving member V has been provided with a non-circular recess 100, and that a complementary plug or tongue 112 has been provided on the lower end of a separate operating stem 114.

The upper end of body member B is provided with a cylindrical packing chamber 116 open at its outer end 118 and terminating at its inner end in a radially inwardly projecting annular abutment 120 centrally bored as at 122 for receiving cylindrical portion 124 of the operating stem which is journaled therein.

Abutment 120 includes an upper axial face 130 and a lower axial face which in the preferred embodiment of the invention is provided with concentric serrations 134.

The cylindrical portion of the operating stem is provided with a radially outwardly extending annular flange 139, having an axial face 140.

An annular resilient sealing element 142 is disposed between and in contacting relationship with the adjacent axial faces 134 and 140 of the body and stem members.

Resilient sealing means 144 is housed within chamber 116 beneath an annular compression member 146.

The numeral 150 denotes an operating nut which is secured to and carried by the upper cylindrical portion 152 of the operating stem. Lower face 154 of the operating nut engages the upper face of compression member or metallic spacer ring 146, the lower face of which engages the upper end of packing material 144 within the packing chamber 116. A thrust collar 160 engages the upper end of the operating nut as at seat 162 whereby axial movement of cap screw 170 into internally threaded bore 172 of the operating stem will simultaneously exert an upward force to flange 139 of the operating stem for tightly compressing the resilient sealing element 142 between axial faces 140 and 134 while the compression member 146 exerts a downward force on packing 144.

In the event that the valve structure of FIG. 10 should be subjected to heat sufficient to dissipate the sealing element 142 and sealing member S, pressure on the upstream face R of the valving member would bodily shift the valving member in a lateral direction whereby to engage the lips which define the downstream or outlet port of the body. Such lateral movement of valving member V will permit the fluid media to enter into and fill area X resulting in the application of a positive outward thrust to the operating stem which will be shifted axially whereby a metal-to-metal contact will be established between axial face 134 of the body member and axial face 140 of the operating stem for thereby effectively precluding the escape of fluid media from the valve body upwardly along the operating stem.

The opposite end of the valve may, by way of example, be constructed as illustrated in FIG. 10; it being understood that the annular resilient sealing element 142 would be seated upon axial face 140 of the actuator stem flange 139 after which the actuator stem would be inserted into the body member from that end opposite the cylindrical packing chamber 116.

Valving member V would then be introduced into the body member, sealing member S having already been associated with the body member.

A set screw 180 threadably engages end plate 182 for applying an axial force to pressure plate 184 which abuts against a metallic diaphragm 186 which backs up a resilient diaphragm 188 of sealing material, surface 190 of which engages end 192 of the valving member V.

The peripheral edges of the diaphragm 186 and 188 are received within suitable annular seats 192 and 194 of the body member whereby to be securely though releasably locked in sealing relationship with the body member incident to the application of an upward axial force by seat 196 of the end plate 182, by suitable means, not illustrated.

From the foregoing, it will be noted that we have provided a lined plug valve which is particularly adapted to safely handle pressure media subjected to high pressures and over high temperature ranges.

The sealing member is reinforced in such a manner by lips 30 as to enable us to utilize the sealing member for its inherent lubricating or bearing area characteristics, in addition to its sealing characteristics. The lips effectively preclude the application of pressure differentials to the sleeve material and they also localize any throttling action of pressure media which might occur incident to opening and closing the valve to occur between the metallic surfaces of the lips of the body member and the valving surface of the valving member.

It should also be noted that our valve will effectively maintain pressure media against accidental or unintentional escape from the valve body even though the valve should be subjected to external heat of such intensity, as during a fire, as to volatilize or otherwise dissipate the sealing member S, or the sealing member S and/or sealing element 142. Under such conditions the valving member, per se, would be laterally moved for providing a metal-to-metal, pressure-media-sealing contact with the seating surface Q of lips 30 of the outlet port—or in the event of a pressure reversal, with seating surface Q of lips 30 of the inlet port.

In FIG. 10 the separable operating stem 114 will be shifted axially incident to dissipation of sealing element 142 for effecting a metal-to-metal, pressure-media-sealing contact between axial faces 134 of the body member and 140 of the stem for precluding the passage of pressure media from the body member via stem 114.

Dissipation of the resilient sealing disc 188 will not result in the escape of pressure media from the body member, since a pressure-media-sealing metal-to-metal contact is always present at the peripheral edge of the metallic diaphragm 186 between body seat 192 and closure plate face 196.

Uniformly satisfactory results have been obtained in those instances in which the sealing member S, sealing element 142, sealing disc 188 and sealing material 144 has been fabricated from materials of the polyethylene group, particularly the halogenated ethylenes which are characterized by outstanding resistance to corrosives and solvents and which have extremely low coefficients of friction. Polytetrafluoroethylene, which is commercially known and available as Teflon, is such a material from which we have fabricated the various sealing members of our valves, with excellent results. Such sealing substances will be completely volatilized and dissipated incident to the application of heat such as, by way of example, would occur if a lined valve were subjected to a fire.

It should be understood that various changes and modifications may be made in the structural details of the device, within the scope of the appended claims, without departing from the spirit of the invention.

What is claimed is:

1. A valve comprising a body member, a rotary valving member and a sealing member, each of said members including flow passages, means mounting said valving member for rotational movement and slight lateral movement relative to said body and sealing members to place the flow passages of said valving member in and out of communication with the flow passages of said body and sealing members, the flow passages of said body member including an axially extending continuation of the body member forming a continuous, circumferential lip projecting toward said valving member and terminating in a seating surface for said valving member, said sealing member comprising a Teflon sleeve encasing the valving member and interposed between said valving member and body member with the flow passages of said sleeve circumscribing the lips of said body member, said sleeve spacing the valving member from and maintaining it out of contact with the said seating surfaces of the lips of said body member, said valving member being laterally displaced by the pressure of fluid media being controlled, incident to dissipation of said sealing member, into contacting relationship with the said seating surfaces of the lips of the body member for precluding the accidental passage of fluid media through the valve when the sealing member is dissipated while the flow passages of the valving member are out of communication with the flow passages of the body member.

2. A valve structure comprising a body member, a circular valving member and a sealing sleeve member, the body member including a valving member enclosing chamber, each of said members having opposite rectangular flow passages, means mounting said valving member in said chamber whereby the valving member is held against vertical movement relative to the body member and the sealing sleeve member to place said rectangular flow passages of said valving member in and out of communication with the rectangular flow passages of said body member and sealing sleeve member, the rectangular flow passages of said body member including a continuous circumferential lip projecting toward and terminating in an inwardly facing surface having a substantial width and opposing the surface of the valving member, said sealing sleeve member lining the surface of said chamber and being interposed between the valving member and the surrounding chamber surface with the flow passages of said sealing sleeve member circumscribing and in engagement with said lips of the body member flow passages, and said sealing sleeve having a thickness greater than the extent of inward projection of the circumscribed lips and normally precluding contact between the valving member and the said inwardly facing surfaces of the lips, the said lips circumscribing the rectangular flow passages precluding the sealing sleeve member being subjected to throttling action and preventing pressure differentials occurring on opposite sides of the sleeve tending to dislodge the sleeve from the body member during rotational movement of the valving member in the opening and closing of the valve, said inwardly projecting termination of the rectangular flow passages defining lips having the said inwardly facing surface transversely curved and paralleling the opposing curved face of the circular valving member and said curved surface of the lip on that side edge of the rectangular inlet port which is first covered incident to rotation of the valving member for placing the rectangular passageway thereof out of communication with said inlet port being of greater width than the inwardly facing surface of the lip on that side edge of the rectangular outlet port which is first covered incident to said rotation of the valving member for placing the rectangular passageway of the valving member out of communication with said outlet port, whereby communication between the valving member passageway and the sealing sleeve adjacent to said outlet port is closed in advance of the closing of communication between said valving member passageway and the sealing sleeve adjacent to said inlet port.

3. A valve structure comprising a body member, a circular valving member and a sealing sleeve member, the body member including a valving member enclosing chamber, each of said members having opposite rectangular flow passages, means mounting said valving member in said chamber whereby the valving member is permitted rotary movement and slight lateral movement and is prevented from vertical movement relative to the body member and the sealing sleeve member to place said rectangular flow passages of said valving member in and out of communication with the rectangular flow passages of said body member and sealing sleeve member, the rectangular flow passages of said body member including a continuous circumferential lip projecting toward and terminating in an inwardly facing transversely curved surface having a substantial width and parallelling the opposing curved surface of the valving member, said sealing sleeve member lining the surface of said chamber and being interposed between the valving member and the surrounding chamber surface with the flow passages of said sealing sleeve member circumscribing and in engagement with said lips of the body member flow passages, the said curved surface of the valving member being constantly in sealing engagement with the sealing sleeve member in and throughout all positions of the valving member relative to the flow passages, and said sealing sleeve member having a thickness greater than the extent of inward projection of the circumscribed lips and normally precluding contact between the valving member and the said inwardly facing surfaces of the lips, the said lips circumscribing the rectangular flow passages precluding the sealing sleeve member being subjected to throttling action and preventing pressure differentials occurring on opposite sides of the sleeve tending to dislodge the sleeve from the body member during rotational movement of the valving member in the opening and closing of the valve, and upon dissipation of the sealing sleeve member, the valving member is movable slightly laterally by pressure of fluid on an inlet side of the body member into contacting relationship with the inwardly facing surface of said lip.

References Cited by the Examiner

UNITED STATES PATENTS

| | | | |
|---|---|---|---|
| Re. 17,724 | 7/1930 | Nordstrom | 137—246.18 |
| 1,026,457 | 5/1912 | Reynolds | 251—316 |
| 2,497,448 | 2/1950 | Grosboll | 251—309 |
| 2,762,601 | 9/1956 | Clade | 251—317 X |
| 2,803,426 | 8/1957 | Zurik | 251—309 X |
| 2,868,499 | 1/1959 | Kamensky | 251—314 |
| 2,940,725 | 6/1960 | Nogel | 251—317 |
| 2,942,840 | 6/1960 | Clade | 251—174 |
| 2,986,374 | 5/1961 | Rakus | 251—317 |
| 2,994,504 | 8/1961 | Reed | 251—317 X |
| 3,030,068 | 4/1962 | Priese | 251—214 |
| 3,058,718 | 10/1962 | Johnson | 251—214 |
| 3,061,269 | 10/1962 | Sinkler | 251—317 |
| 3,066,909 | 12/1962 | Reed | 251—317 X |

FOREIGN PATENTS 596,197    7/1959    Italy.

M. CARY NELSON, *Primary Examiner.*

CLARENCE R. GORDON, ISADOR WEIL,
*Examiners.*

A. JAFFE, E. FEIN, *Assistant Examiners.*